UNITED STATES PATENT OFFICE.

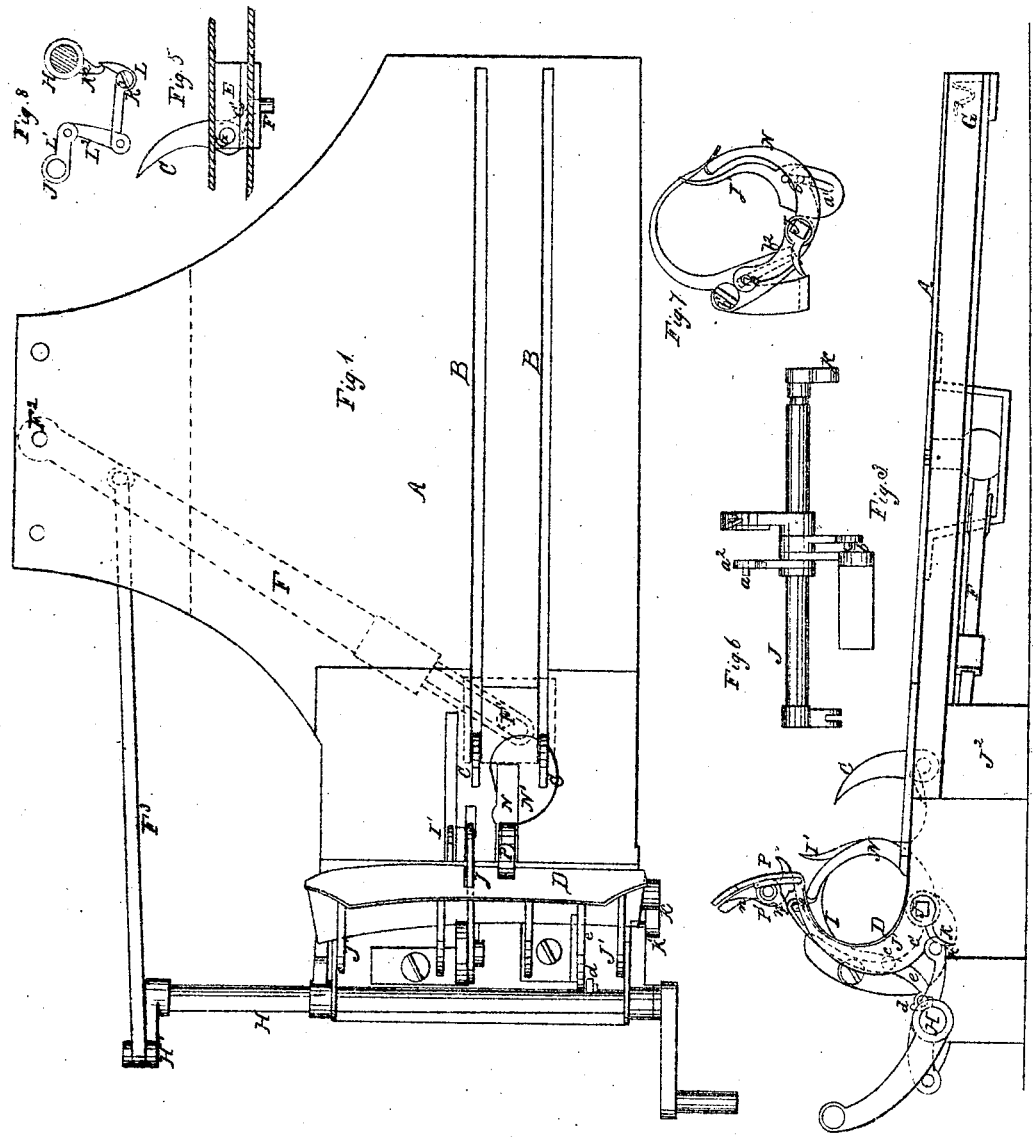

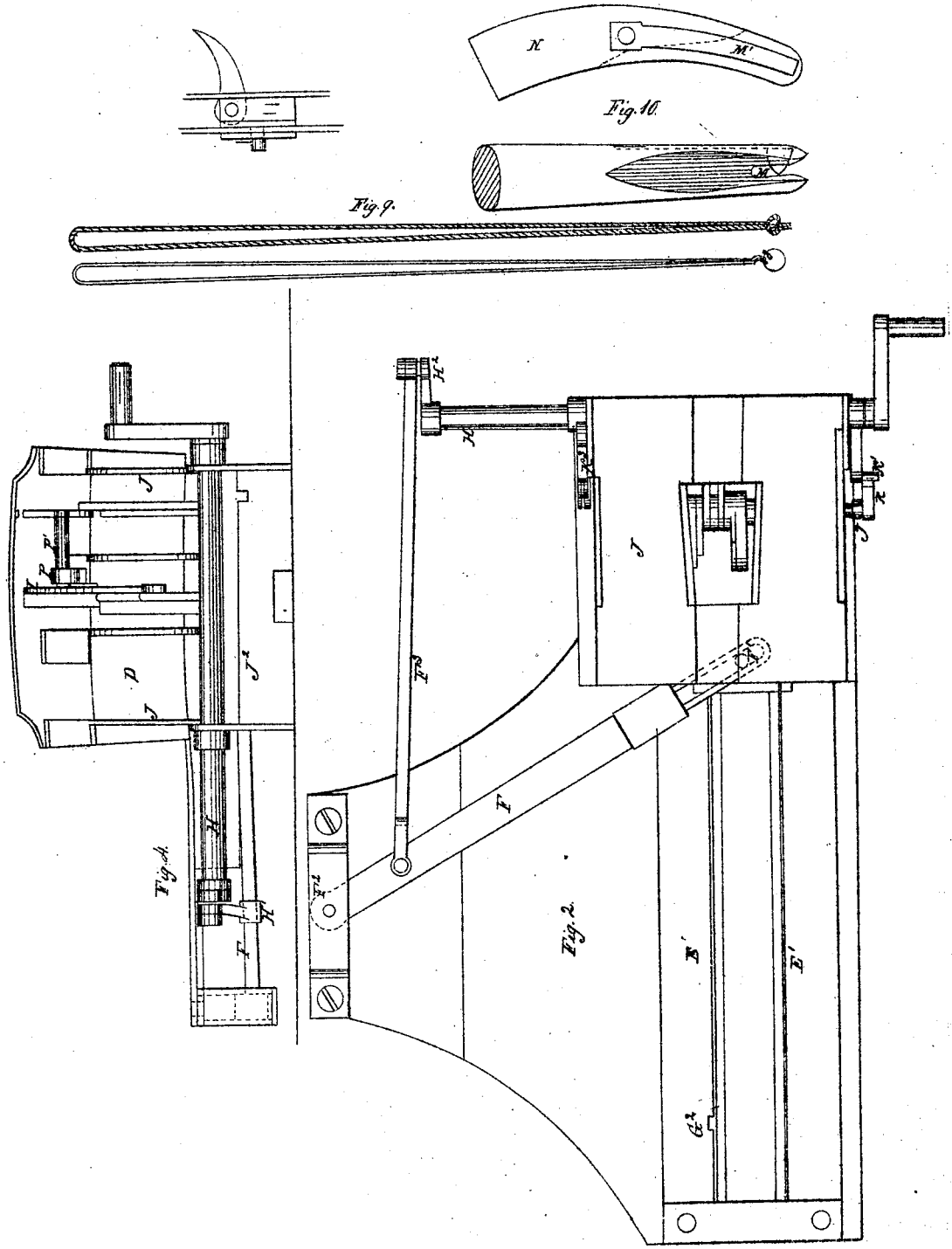

A. B. SMITH, OF CLINTON, PENNSYLVANIA.

IMPROVEMENT IN RAKING AND BINDING APPARATUS FOR HARVESTERS.

Specification forming part of Letters Patent No. 28,783, dated June 19, 1860.

*To all whom it may concern:*

Be it known that I, ABIA B. SMITH, of Clinton, in the county of Allegheny and State of Pennsylvania, have invented certain new and useful Improvements in Raking and Binding Apparatus for Harvesters; and I do hereby declare that the same are described and represented in the following specifications and drawings.

To enable others skilled in the art to make and use my improvements, I will proceed to describe their construction and operation, referring to the drawings, in which the same letters indicate like parts in each of the figures.

Figure 1 is a plan or top view; Fig. 2, the under side of the machine; Fig. 3, front elevation; Fig. 4, elevation of one end.

The other figures will be referred to in the specification.

The nature of my invention and improvements in the raking and binding apparatus for harvesters consists in a mechanism or devices arranged to operate one or more compressing-arms independent of the binding-arm, and work said compressing-arms down on top or over the gavel; also, in a mechanism or devices for operating one or more compressing-arms working up under the gavel independently of the binding-arms, so as to compress the gavel without the aid of the band, or arm carrying the band and in arranging the compressing-arms to work before or in advance of the arm that carries the band to open a space in the grain or straw on the platform for the end of the binding-arm to come through; and in arranging the mechanism to operate the binding-arm with a positive motion in each direction; also, in hollowing the under side of the hook which holds the loop of the band, and casts it over the knot on the opposite end of the band.

In the accompanying drawing, A is the platform of a reaper, on which the cut grain falls, provided with two long slots, B B, in which the rake-teeth C C traverse to gather the cut grain from the platform into the gavel-box D at the end of the platform A. E is a carriage, arranged to traverse between the ways E' E' under the platform, and is operated by the lever F, which has a slot in it for the pin $F^1$ in the carriage. G, Fig. 5, is a rock-shaft, arranged to turn in the carriage E, and carry the rake-teeth C C. $G^1$ is a dog, arranged on the end of the rock-shaft, so as to traverse against the way E', and hold the teeth C C in the position shown in Fig. 5, when the teeth are carried to the gavel-box, and when the carriage is moved from the gavel-box the point of the dog catches the end of the way, aided by a spring or otherwise, and turns the shaft, so as to carry the teeth from the gavel-box in the slots below the platform, and when the point of the dog gets opposite the notch $G^2$, Fig. 2, the spring $G^3$, Fig. 3, acts against one of the teeth C and raises it, turning the point of the dog into the notch, so that when the carriage moves toward the gavel-box the dog turns the teeth up into the position shown in Fig. 5, and holds them up until they arrive at the gavel-box, as above mentioned. The lever F is pivoted in the rear of the platform at $F^2$, and is operated by the link $F^3$, which connects it to the crank H' on the shaft H, which turns in bearings provided for it behind the gavel-box, and may be provided with a gear to receive its motion from the driving-wheel of the machine. I I' are compressing-arms. The latter vibrates on a stand under the gavel-box, and is provided with a slot, $a^1$, for the pin $a$ in the arm $a^2$ on the rock-shaft J. The arm I vibrates on the screw $b^1$, (in a stand fastened to the frame behind the gavel-box,) and is operated by the pin $b$, Figs. 6 and 7, in the arm $b^2$ of the rock-shaft J, which pin $b$ works in a slot in the arm I. (Shown by dotted lines in Fig 7.) The rock-shaft J, turns in the stands $J^1$ $J^1$, which are fastened to the main frame $J^2$, which stands also support the gavel-box D. This rock-shaft J has an arm, K, at one end, which is struck by the tappet $K^1$ on the shaft H, to turn the shaft J and close the compressing-arms I and I' around the gavel in the box D, and hold it until the band is hitched, when the tappet $K^2$ strikes the end of the lever $K^3$, and turns the shaft J in the opposite direction, to open the arms I I' and release the sheaf. The arms I I' vibrate through slots in the platform and gavel-box. The lever $K^3$ vibrates on the screw L in the stand $J^1$, and is connected to the arm L¹, on the rock-shaft J by the link L², (see Fig. 8,) where the several parts are shown in connection.

The bands used to bind the gavels with my improvements may be made of twine or wire, with a loop at one end and a knot or button at the other. (See Fig. 9.) The attendant places the knot end of the band in the score M, where it is retained by the spring-latch M' in the end of the binding-arm N, Fig. 10, and the loop of the band over the hook P, Fig. 3, so that the band lies across the gavel-box ready to receive the gavel as it is raked into it from the platform A, the arm N sinking into its slot below the platform, and the knot on the band into the cavity N'. (Shown by dotted lines in Fig. 3.)

When the gavel is raked into the box and is compressed by the arms I I', the arm N, which is fastened to the rock-shaft J and operated by it, brings the knot end of the band up over the gavel under the hook P, which is then drawn back to cast the loop over the knot or button on the band, so as to hold the band around the gavel and form a sheaf, while the arm N is drawn back, and the band slips out of the score by the spring-latch M'.

The hook P is rounded on the top and hollowed out on the under side, to facilitate the casting the loop over the knot in binding the gavels. This hook is fastened to the rock-shaft P', Fig. 4, which turns in stands fastened to the back of the gavel-box, and is operated by the tappet d (see Figs. 1 and 3) in the shaft H, which presses in the end of the lever e, which acts on the pin f in the arm k of the rock-shaft P'. The lever e vibrates on a screw, c, (shown by dotted lines in the stand C', Fig. 3,) which stand is fastened to the main frame. The lever e has a slot in its upper end for the pin f on the arm k to work in, and the arm k, after being raised to draw back the hook P, is pressed down again to push out the hook by the spring n, fastened to the gavel-box. The hook P works in a slot in the gavel-box, and the sides of the slot hold the loop over the knot while the hook is drawn out of it, the knot being held under the curve of the gavel-box by the binding-arm N.

With my improvements the gavel is compressed by the compressing-arms, which are operated independently of the binding-arm, and so far in advance or before the binding-arm, that they relieve the band and the arm that carries the band entirely of the labor of compressing the gavel; besides, my compressing and binding apparatus, I believe, performs the work of compressing and binding a gavel in less than a fourth of the time required to cut grain enough to form a gavel; therefore, it leaves more than three-fourths of the time for the attendant to remove the sheaf from the gavel-box and place another band so as to be ready to receive the next gavel when it is raked into the box. The bands used by my machine are very simple and cheap, and may be used for a series of years, if taken care of, so that the cost of bands is very trifling; besides, any farmer can make his own bands during the leisure season of the year.

I believe I have described and represented my improvements in the rakers and binders of harvesters so as to enable any person skilled in the art to make and use them.

I will now state what I desire to secure by Letters Patent, to wit:

I claim—

1. The mechanism described, or its equivalent, arranged to operate one or more compressing-arms independently of the binding-arm, and work said compressing-arm down on top and over the gavel, substantially as described.

2. In combination with one or more compressing-arms, arranged to work down over the grain or gavel, as above described, the mechanism described, or its equivalent, for operating one or more compressing arms, working up under the gavel, independently of the binding-arm, substantially as described, so as to compress the gavel without the aid of the band or arm carrying the band.

3. The mechanism, or its equivalent, for making the compressing-arms to work before or in advance of the arm that carries a band, to open a space between the grain or straw on the platform and the gavel for the end of the binding-arm to come through, substantially as described.

4. The application and arrangement of the devices, substantially such as are herein described, which operate the binding-arm N with a positive motion in each direction, for the purpose specified.

5. The hook P, hollowed on its under side, operating in combination with the binding-arm N, carrying the knotted end of the band, as described.

ABIA B. SMITH.

Witnesses:
JOHN HARPER,
FRANCIS FLOOD.